United States Patent [19]

Fukui

[11] 4,116,293
[45] Sep. 26, 1978

[54] DRIVING MECHANISM

[75] Inventor: Kiyozumi Fukui, Gifu, Japan

[73] Assignee: Teijin Seiki Company Limitejd, Osaka, Japan

[21] Appl. No.: 699,971

[22] Filed: Jun. 25, 1976

[30] Foreign Application Priority Data

Jul. 4, 1975 [JP] Japan ................................. 50-82949
Jul. 16, 1975 [JP] Japan ................................. 50-86895
Sep. 30, 1975 [JP] Japan ................................. 50-117922

[51] Int. Cl.² ........................................... B62D 55/12
[52] U.S. Cl. ................................... 180/43 B; 74/391; 74/801
[58] Field of Search ................. 74/431, 391, 410, 801; 180/43 B

[56] References Cited

U.S. PATENT DOCUMENTS

| 2,763,160 | 9/1956 | Buckendale | 74/391 |
| 3,477,547 | 11/1969 | Kress et al. | 180/43 B |
| 3,737,000 | 6/1973 | Knoboch et al. | 180/43 B |

FOREIGN PATENT DOCUMENTS

| 561,054 | 7/1958 | Canada | 180/43 B |
| 28,179 of | 1907 | United Kingdom | 74/391 |

Primary Examiner—Stephen C. Bentley
Attorney, Agent, or Firm—Cushman, Darby & Cushman

[57] ABSTRACT

A driving mechanism comprises an input sun gear meshing with planet gears; and an output shaft of a motor detachably inserted into said input sun gear to enable said input sun gear to be radially movable to a very small degree, whereby said planet gears are allowed to effect a very small eccentric revolutional motion when the torque of said output shaft is transmitted to said input sun gear.

5 Claims, 8 Drawing Figures

DRIVING MECHANISM

The present invention relates to a driving mechansim and, in particular, to a driving mechanism involving a planetary reduction gear.

In general, the planetary reduction gear is employed for the purpose of reducing rotational speeds when the rotational torque of a driving shaft is transmitted to a driven body such as a driven shaft, an output ring gear and the like. The planetary reduction gear comprises an input sun gear and planet gears meshing therewith, and was conventionally required to enhance accuracy of the gears for smooth rotation thereof. This results in requirement for enhancement in accuracies of various tools as well as of their manufacture, thereby causing increase in gear manufacturing costs. In a variety of driving mechanisms for use in earth moving vehicles such as for example bulldozers, power shovels, tread scrapers and the like, a hydraulic motor and a reduction gear unit drivably connecting the hydraulic motor and a driven rotating wheel are employed for driving a tread with the driven rotating wheel to move on a bumpy or rough road. The driving mechanism involving the hydraulic motor and the reduction gear unit was conventionally projected outwardly of the width of the tread so that either the hydraulic motor or the reduction gear unit frequently came into collision with hard obstacles such as rocks and the like projected upwardly from the ground during running of the earth moving vehicle on the bumpy road. This resulted in breakage of the hydraulic motor and the reduction gear unit, thus requiring frequent disassembly and reassembly for their repair and replacement. On the other hand, the hydraulic motor has a generally greater longevity in longevity than a reduction gear unit even if the above breakage does not take place in the vehicle since various mechanical parts of the motor and the reduction gear unit are subject to different abrasion effects. This also necessitates disassembly and reassembly in order to repair or replace the hydraulic motor and the reduction gear unit. In addition, each of the conventional driving mechanisms has been of such a construction that the hydraulic motor and the reduction gear unit were attached in this order or in a reverse order to one side of the rotating wheel so that one of them located at a position remote from the rotating wheel was required to be disassembled in order to replace or repair the other located at a position adjacent the rotating wheel. The disassembling and reassembling operations, therefore, necessitated not only much time but also harder or tedious labour.

It is therefore an object of the present invention to provide a driving mechanism which does not require for enhancement in the accuracy of various tools as well as of their manufacture so as to decrease in gear manufacturing costs.

It is another object of the present invention to provide a driving mechanism which is compact in construction to such a degree that it is shorter in width than the tread.

It is a further object of the present invention to provide a driving mechanism which is adapted to readily be disassembled and reassembled.

It is still another object of the present invention to provide a driving mechanism which is designed not to require much time and harder or tedius labour, which have thus far been necessitated, upon disassembling and reassembling operations.

In order to accomplish these foregoing objects, a driving mechanism according to one embodiment of the present invention comprises: an input sun gear meshing with planet gears; and an output shaft of a motor detachable inserted into the input sun gear to enable said input sun gear radially movable in a very small degree, whereby the planet gears are allowed to effect a very small eccentric revolutional motion when the torque of the output shaft is transmitted to the input sun gear. A driving mechanism in accordance with another embodiment of the present invention comprises: a driven wheel; a hydraulic motor fixedly supported on a stationary structure to be removable from one side of the driven wheel and having an output shaft; and a reduction gear unit detachably attached to the other side of the driven wheel and having an input sun gear detachably connected to the output shaft of the hydraulic motor for radial movement of the input sun gear in a very small degree. A driving mechanism in accordance with a further embodiment of the present invention comprises: a driven wheel having a bore extending along its rotational axis; a hydraulic motor covered by a motor housing which is fixedly supported on a stationary structure and accommodated in the bore of said driven wheel for rotatably supporting the driven wheel; and a reduction gear unit having an input sun gear detachably connected to an output shaft of the hydraulic motor for radial movement of the input sun gear in a very small degree upon transmitting the torque of the hydraulic motor to the driven wheel.

The features and advantages of the driving mechanism according to the present invention will become more apparent from the following description taken in conjunction with the accompanying drawings, in which.

Figure 1:
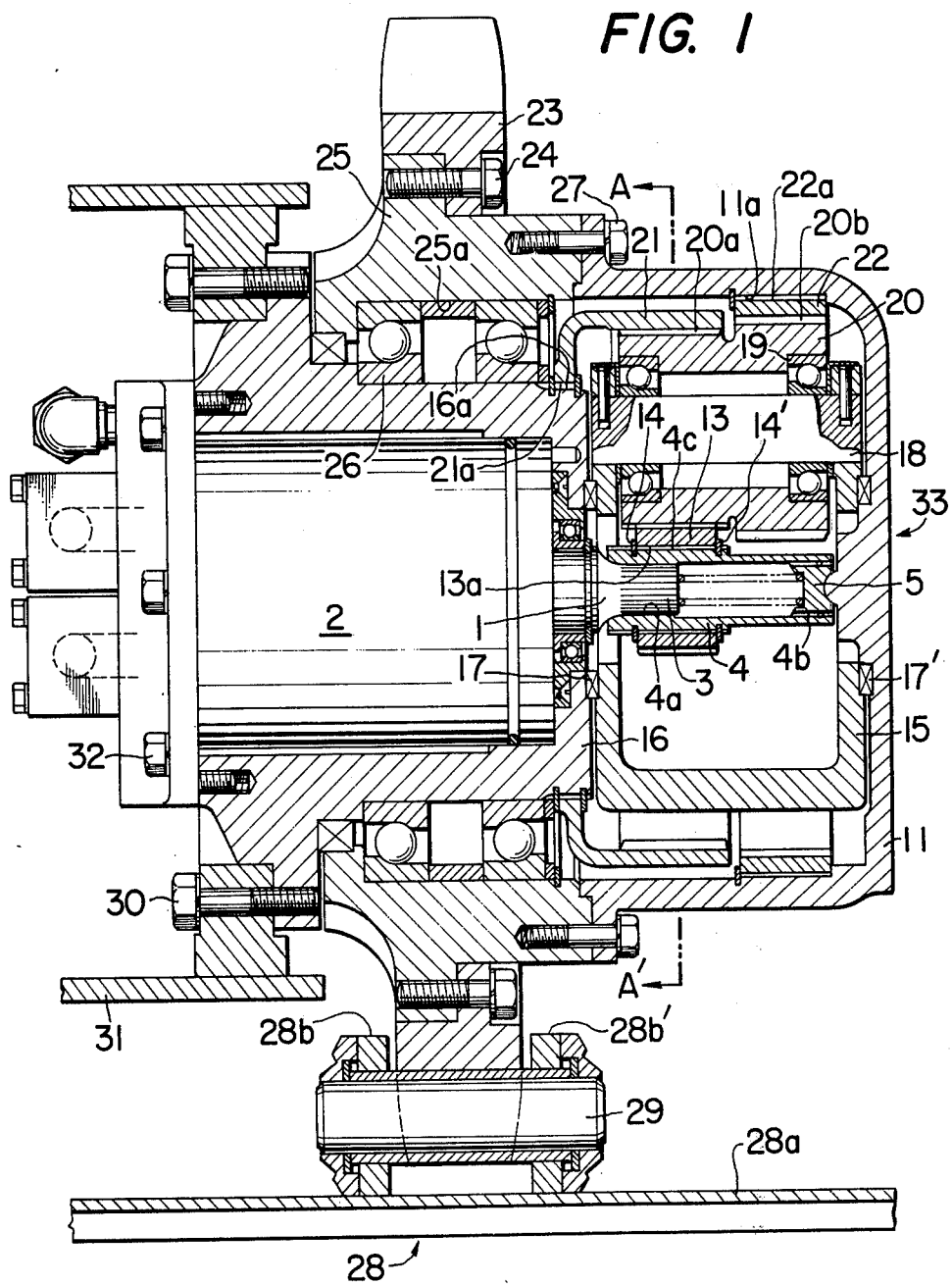
FIG. 1 is a cross sectional view of a hydraulic motor to be accommodated in a motor housing constituting a component of a driving mechanism in accordance with one embodiment of the present invention.
Figure 2:
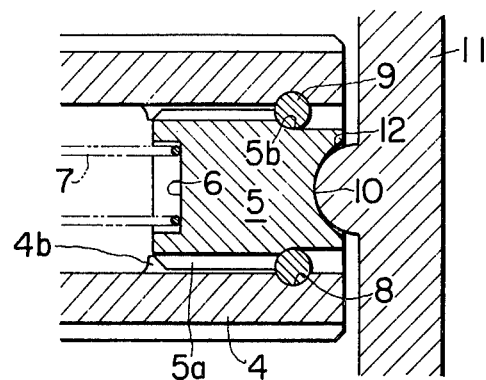
FIG. 2 is an enlarged cross-sectioned view partially showing a hollow shaft including a casing of a reduction gear unit assembled in the embodiment of the present invention.
Figure 3:
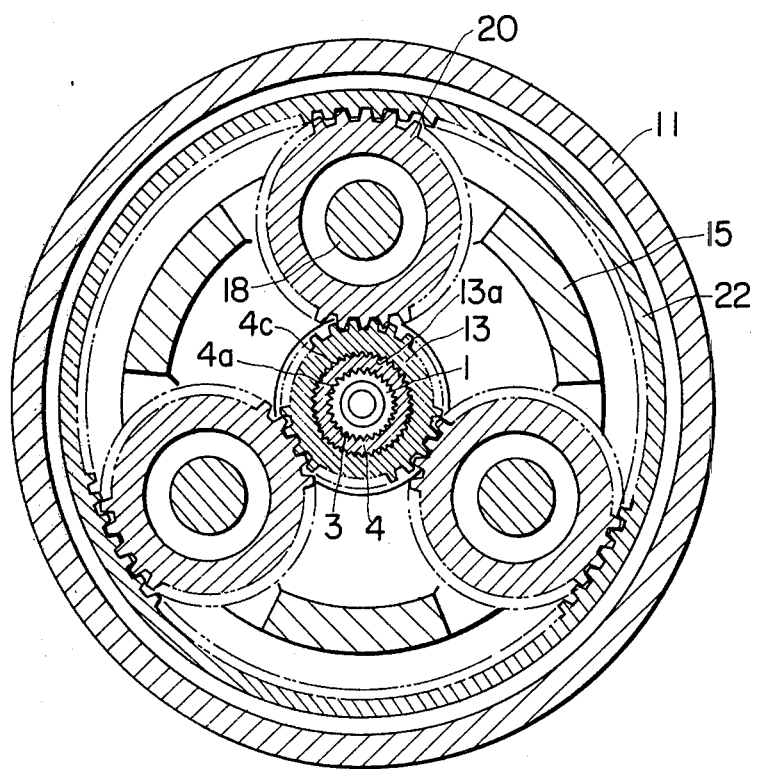
FIG. 3 is a cross-sectional view as seen from the lines A-A' in FIG. 1.

Referring now to the drawings and in particular to FIG. 1, the reference numeral 1 designates an output shaft of a hydraulic motor 2 the forward end portion of which is formed with splines 3 axially extending on its periphery. A hollow shaft 4 is formed with inner splines 4a and 4b axially extending on the inside surface of the opposite ends of the shaft 4, the splines 4a being in meshing relation with the splines 3 of the output shaft 1. A cylindrical bearing 5 is shown particularly in FIG. 2 as having on its outer periphery splines 5a which are adapted to be meshed with the splines 4b of the hollow shaft 4. On the rear face of the bearing 5 opposing to the output shaft 1 is formed a round cross-sectioned recess 6 which receives one end of a compression coil spring 7 having the other end abutted against the fore face of the output shaft 1. On the forward inner periphery of the hollow shaft 4 is formed an annular groove 8 which is adapted to snugly receive a stopping ring 9 engaged with a cut-away portion 5b formed on the periphery of the bearing 5 so that the bearing 5 is prevented from being pushed out of the hollow shaft 4 by the compression coil spring 7. The bearing 5 is formed on the forward face thereof to have a semi-spherical projection 12 internally and integrally formed on a casing 11 so that the end of the hollow shaft 4 is slidably rested on the projection 12. The hollow shaft 4 has an outer rear half periphery axially splined as at 4c which are in meshing engagement with splines 13a formed to axially extend on the inner periphery of an input sun gear 13 which is in turn securely mounted on the hollow shaft 4 by means of snap rings 14 and 14'. A carrier 15 is rotatably supported through bearings 17 and 17' on the casing 11 and a motor housing or stationary retaining member 16 accommodating therein a hydraulic motor 2. On the carrier 15 are fixedly mounted planet gear shafts 18 each of which rotatably supports a planet gear 20 through bearings 19. Three planet gears 20 are usually arranged as shown in FIG. 3 in a circumferential direction each of which has a first gear portion 20a meshed with the input sun gear 13 and a second gear portion 20b integrally formed with the first gear portion 20a. A fixed annular ring gear 21 is designed to be meshed with the first gear portions 20a of the planet gears 20 and has an inner rear face splined as at 21a to be in meshing relation with splines 16a formed on the fore outer periphery of the motor housing 16. The second gear portion 20b of the planet gears 20 are meshed with a toothed inner periphery of an output annular ring gear 22 which has a splined outer periphery 22a to be meshed with splines 11a internally formed on the casing 11. A sprocket wheel 23 is secured by means of bolts 24 to a driven wheel or member 25 which is rotatably supported on the motor housing 16 through bearings 26 and which is securely connected with the casing 11 by means of bolts 27. An endless belt or tread, generally designated at 28, consists of a series of flat treads 28a each of which has a pair of spaced legs 28b and 28b' fixedly supporting both ends of a pin member 29 which is engageable with the sprocket wheel 23. The motor housing 16 is seen as fixed to a stationary frame 31 by bolts 30. It is to be noted from the above embodiment that the hydraulic motor 2 is fixedly supported on the motor housing 16 by means of bolts 32 so as to be removable from one side of the driven wheel 25 and the input sun gear 13 is detachably connected to the output shaft 1 of the hydraulic motor 2 for radial movement of the input sun gear 13 in a very small degree. This make it possible for the hydraulic motor 2 and the reduction gear unit 33 to be independently removed from their respective sides so that the disassembling and reassembling operation can be readily performed without much time and tedious labour. It is also to be appreciated that the driven wheel 25 is formed to have an axially extending bore 25a which accommodates the motor housing 16 and that the input sun gear 13 of the reduction gear unit 33 is detachably connected to the output shaft 1 of the hydraulic motor 2 for radial movement of the input sun gear 13 in a very small degree upon transmitting the torque of the hydraulic motor 2 to the driven wheel 25. Resulting from the motor housing 16 telescopically accommodated in the bore 25a of the driven wheel 25, the driving mechanism can be made compact as a whole in construction to such a degree that it is shorter in width than the endless belt or tread 28.

The operation of the driving mechanism thus constructed and arranged will now be described with reference to FIGS. 1 to 3.

When the hydraulic motor 2 is rotated for rotation of the output shaft 1, the input sun gear 13 and the casing 11 are caused to rotate through the hollow shaft 4. At this time, the hollow shaft 4 is capable of radially moving in a very small degree with respect to the axial line of the output shaft 1 even if the input sun gear 13, the planet gears 20, the output annular ring gear 22 and the fixed annular ring gear 21 are made worse in accuracy, thereby allowing the planet gears 20 to be rotated eccentrically in a very small degree. The very small eccentrical rotation or displacement of the hollow shaft 4 is thus performed in such a manner that the baring 5 radially slides on and with respect to the projection 12, resulting in both axial lines of the bearing 5 and the projection 12 being dislocated. Since bearing 5 and the projection 12 are adapted to be radially slidably engaged with each other as well as being urged toward each other by the action of the compression coil spring 7, a centripetal function to the planet gear 20 is caused during rotation of the output shaft 1. The rotation of the casing 11 enables the sprocket wheel 23 to be rotated through the driven wheel 25 so that the endless belt 28 is caused to be driven by way of the pin member 29 and the legs 28b, 28a.

While there has been described in the foregoing embodiment that the output shaft 1 is inserted through the hollow shaft 4 which is in splinedly meshing relation with the input sun gear 13, the present invention may be constituted as follows.

Figure 4:
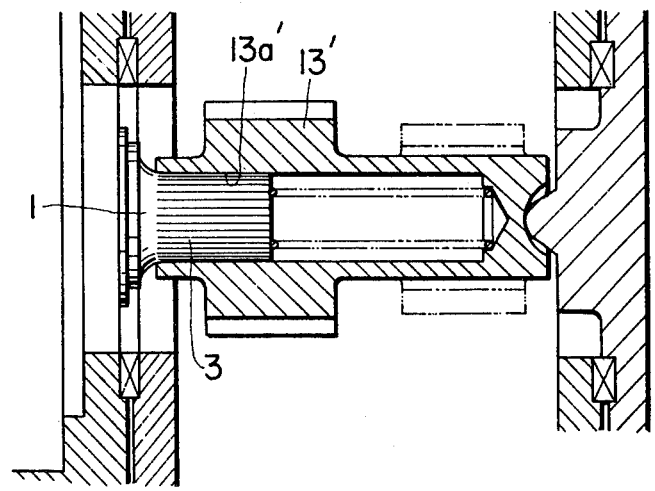
FIG. 4 is an enlarged fragmentary cross-sectional view showing another embodiment of an input sun gear including an output shaft of the hydraulic motor and the casings.
Figure 5:
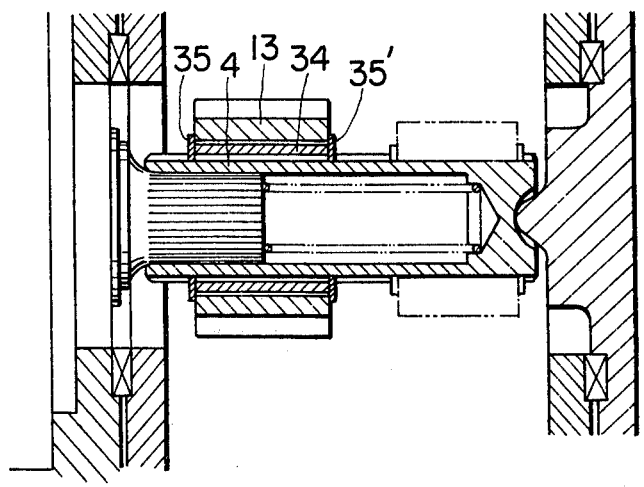
FIG. 5 is an enlarged fragmentary cross-sectional view similar to FIG. 4 but showing a further embodiment around an input sun gear including the output shaft of the hydraulic motor and the casing.
Figure 6:
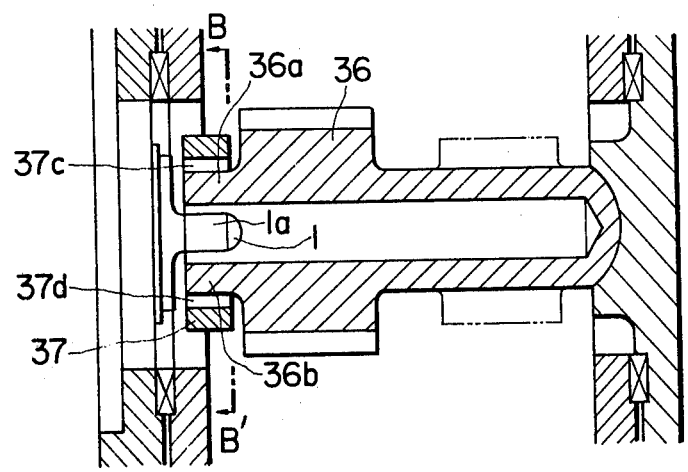
FIG. 6 is an enlarged fragmentary cross-sectional view similar to FIGS. 4 and 5 but showing still another embodiment around an input sun gear including the output shaft of the hydraulic motor and the casing.
Figure 7:
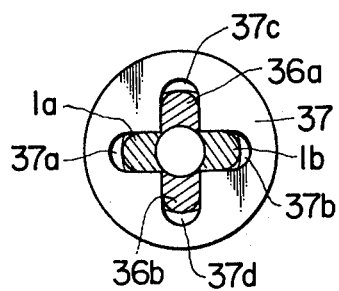
FIG. 7 is a view, partially cross-sectioned, as seen from the lines B-B' in FIG. 6.

As shown in FIG. 4, the input sun gear 13' may be formed on its inner periphery with axially extending splines 13a' in meshing relation with the splines 3 of the output shaft 1 without employing the previously mentioned hollow shaft 4. Alternatively, the hollow shaft 4 may be connected to the input sun gear 13 through a cylindrical member 34 of resilient material such as rubber, plastic and the like interposed therebetween and securely fixed to the hollow shaft 4 by means of snap rings 35 and 35' as illustrated in FIG. 5. In addition, an input sun gear 36 may radially movably be coupled with the output shaft 1 as shown in FIGS. 6 and 7. The output shaft 1 is formed with two radial projections 1a and 1b extending in parallel relation and the input sun gear 36 is formed on its end opposite to the output shaft 1 with two radial projections 36a and 36b extending in parallel relation. A coupling 37 is formed with four radial bores 37a, 37b, 37c and 37d extending in an equiangular relation with each other, i.e., at right angles to each other. Two of the radial bores 37a and 37b are adapted to be engaged with the radial projection 1a and 1b, respectively, of the output shaft 1, while the remaining two radial bores 37c and 37d are engaged with the radial projections 36a and 36b, respectively, of the input sun gear 36. As a result of this, the input sun gear 36 is slightly moved in a radial direction. On the other hand, the meshing positions of the input sun gear may be replaced depending upon reduction ratios to positions as shown in phantom lines of FIGS. 4 to 6 so as to cause the input sun gear to be brought into meshing relation with each of the second gear portion 20b of the planet gear 20.

Figure 8:
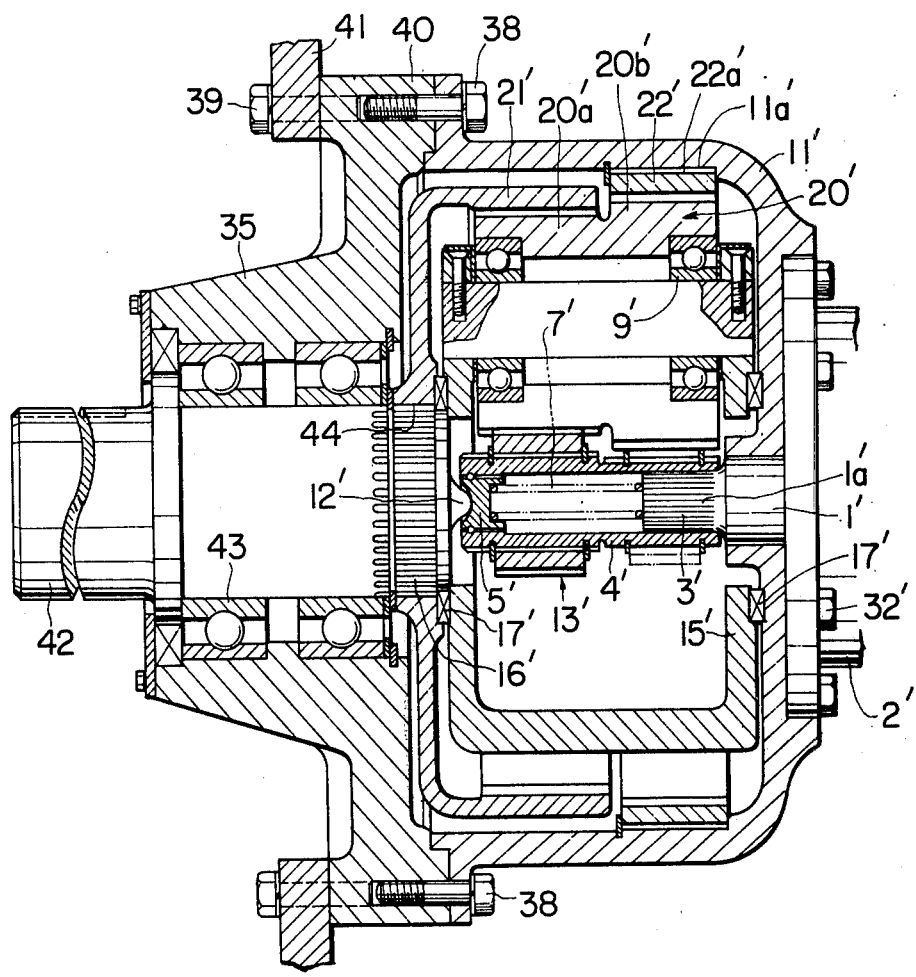
FIG. 8 is a cross-sectional view similar to FIG. 1 but showing a driving mechanism in accordance with another embodiment of the present invention.

The present invention may be applied as shown in FIG. 8 to another embodiment whose constitutional elements bear similar reference numerals but primed if they are same or corresponding to the constitutional elements of FIG. 1. The internal function or movement of this embodiment is substantially identical to that of the foregoing embodiment unitl the planet gears 20' begin to be rotated by the output shaft 1' of the hydraulic motor 3' but not the same in the following aspects. The second gear portions 20b' of the planet gears 20' are held in meshing engagement with the fixed annular ring gear 22' which is connected through splines 11'a and 22'a formed on the inner periphery of the casing 11' and the outer periphery of the fixed annular ring gear 22', repsectively. The casing 11' is bolted as at 38 and 39 to a stationary frame structures 40 and 41 which is adapted to rotatably receive an output shaft 42 is splined as at 44 to an output annular ring gear 21' which is in turn meshed with the first gear portions 20'a of the planet gears 20' so that the rotational torque of the output shaft 42 is transmitted from the first gear portions 20'a of the planet gears 20 through the output annular ring gear 21'.

While it has been explained in the above embodiment that the hollow shaft 4 accommodated therein the bearing 5 and the compression coil spring 7, the output shaft 1 may be adapted to extend throughout the hollow shaft 4 without providing the bearings 5 and the compression coil spring 7 so as to loosely fit the extended output shaft with the hollow shaft 4. In this case, there causes a similar advantage to that of the foregoing embodiment. The term "splines" used in the above is intented to mean "axially extending streaks" each having a cross-section of concave or concavity form in the present invention. The number of the streaks will be arbitrarily selected and the cross-section of concave or concavity form may assume any one of triangular, square and the like forms. The hydraulic motor previously mentioned in the above embodiments may be replaced by an electric motor according to the present invention.

It is to be understood that the input sun gear is allowed to be movable radially in a very small degree, thereby causing the planet gears to carry out a slight eccentric motion. As a result of this, the planet gears can be smoothly rotated even if all the gears assembled in the reduction gear are of inferior accuracy. This will make it possible to use gears having inferior accuracy, resulting in inexpensive costs for manufacturing them. It is also to be appreciated that the driving mechanism can be adapted to be shorter in width than the tread width since the output shaft of the motor is inserted into the hollow shaft or the input sun gear and the motor is telescopically accommodated in the bore of the driven wheel. Therefore, neither the hydraulic motor nor the reduction gear unit will come into collision with hard obstacles such as rocks and the like projected upwardly from the ground during running of the earth moving vehicles on the bumpy road.

The detailed description of the preferred embodiment of the invention for the purpose of explaining the principles thereof is not to be considered as limiting or restricting the invention, and many modifications may be made by the exercise of skill in the art without departing from the scope and spirit of the invention.

What is claimed is:

1. A driving mechanism comprising:
   a stationary structure;
   a drive motor fixedly supported by said stationary structure and having an output shaft;
   a reduction gear unit including a hollow shaft having a hollow cavity axially extending and splinedly coupled at one end portion with said output shaft of said drive motor, a bearing accommodated in said hollow cavity to be splinedly coupled with the other end portion of said hollow shaft and having a semi-spherical cavity, a compression coil spring accommodated in said hollow cavity and having one end in contact with said output shaft and its other end in contact with said bearing to urge said hollow shaft and bearing axially outwardly of said hollow shaft and an input sun gear located on the outer periphery of said output shaft; and
   a driven body driven by said drive motor through said reduction gear unit and having a central projection opposite said bearing which is semi-spherically formed and rotatably engaging with said semi-spherical cavity of said bearing to retain said input sun gear in axial alignment with said output shaft while said hollow shaft is supported by said output shaft and said central projection so as to be movable in a radial direction thereof to a very small degree.

2. A driving mechanism as claimed in claim 1, wherein said driven body includes a driven wheel and a casing securely attached to said driven wheel and wherein said reduction gear unit further includes a ring gear securely attached to the inner periphery of said casing, and planet gears meshed with said input sun gear and said ring gear.

3. A driving mechanism as claimed in claim 2, wherein each of said planet gears has a first gear portion meshed with said input sun gear and a second gear portion integrally formed with said first gear portion and meshed with said ring gear; and wherein said reduction gear unit includes an additional ring gear meshed with said first gear portion of each of said planet gears and splined to said stationary structure.

4. A driving mechanism as claimed in claim 2, wherein said driven wheel of said driven body has a bore extending along its rotational axis and partially accommodating therein said stationary structure to form an annular space chamber therebetween, said annular space chamber receiving at least one bearing rotatably supporting said driven wheel.

5. A driving mechanism as claimed in claim 1, wherein said input sun gear is splinedly coupled with the outer periphery of said hollow shaft.

* * * * *